(12) United States Patent
Kwon et al.

(10) Patent No.: US 10,882,976 B2
(45) Date of Patent: Jan. 5, 2021

(54) RESIN COMPOSITION FOR PREPARING POLYOLEFIN BASED FLAME RETARDANT FOAMED ARTICLES AND FLAME RETARDANT FOAMED ARTICLES THEREFROM

(71) Applicant: LOTTE CHEMICAL CORPORATION, Seoul (KR)

(72) Inventors: Yong Jin Kwon, Seoul (KR); Sung Hwan Lim, Daejeon (KR); Se Yeon Eom, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 12 days.

(21) Appl. No.: 16/333,525

(22) PCT Filed: Sep. 19, 2017

(86) PCT No.: PCT/KR2017/010220
§ 371 (c)(1),
(2) Date: Mar. 14, 2019

(87) PCT Pub. No.: WO2018/052267
PCT Pub. Date: Mar. 22, 2018

(65) Prior Publication Data
US 2019/0256687 A1 Aug. 22, 2019

(30) Foreign Application Priority Data
Sep. 19, 2016 (KR) .................. 10-2016-0119487

(51) Int. Cl.
| | |
|---|---|
| *C08F 10/06* | (2006.01) |
| *C08J 9/232* | (2006.01) |
| *C08K 13/02* | (2006.01) |
| *C08J 9/00* | (2006.01) |
| *C08J 9/35* | (2006.01) |
| *C08K 3/32* | (2006.01) |
| *C08K 5/3492* | (2006.01) |
| *C08L 23/22* | (2006.01) |
| *C08L 23/00* | (2006.01) |
| *C08L 23/12* | (2006.01) |
| *C08L 23/16* | (2006.01) |
| *C08L 23/06* | (2006.01) |

(52) U.S. Cl.
CPC .............. *C08K 13/02* (2013.01); *C08F 10/06* (2013.01); *C08J 9/00* (2013.01); *C08J 9/0028* (2013.01); *C08J 9/0066* (2013.01); *C08J 9/232* (2013.01); *C08J 9/35* (2013.01); *C08K 3/32* (2013.01); *C08K 5/34924* (2013.01); *C08K 5/34928* (2013.01); *C08L 23/00* (2013.01); *C08L 23/06* (2013.01); *C08L 23/12* (2013.01); *C08L 23/16* (2013.01); *C08L 23/22* (2013.01); *C08J 2203/22* (2013.01); *C08J 2323/12* (2013.01); *C08K 2003/323* (2013.01); *C08K 2201/014* (2013.01)

(58) Field of Classification Search
CPC .. C08F 10/06; C08J 9/00; C08J 9/0004; C08J 9/0019; C08J 9/0028; C08J 9/0038; C08J 9/0066; C08J 9/232; C08J 9/35; C08J 2203/22; C08J 2323/02; C08J 2323/12; C08J 9/16; C08K 13/02; C08K 3/32; C08K 5/34924; C08K 5/34928; C08K 2003/323; C08K 2201/014; C08L 23/00; C08L 23/06; C08L 23/12; C08L 23/16; C08L 23/22; C08L 2666/84
See application file for complete search history.

(56) References Cited

U.S. PATENT DOCUMENTS

| | | | | |
|---|---|---|---|---|
| 4,568,608 A | * | 2/1986 | Kuwabara | ............... C08J 9/228 428/402 |
| 4,596,833 A | * | 6/1986 | Endo | .................. C08J 9/0038 521/143 |
| 4,698,191 A | * | 10/1987 | Endo | .................. C08J 9/232 264/50 |
| 6,313,184 B1 | * | 11/2001 | Sasaki | .................. C08J 9/16 521/56 |
| 6,607,682 B1 | * | 8/2003 | Yamaguchi | ......... B29C 44/3461 264/126 |
| 2010/0324182 A1 | | 12/2010 | Ing.Roth | |
| 2011/0237715 A1 | | 9/2011 | Xalter | |

(Continued)

FOREIGN PATENT DOCUMENTS

| | | |
|---|---|---|
| JP | 07-179647 A | 7/1995 |
| JP | 10-298329 A | 11/1998 |
| JP | 2004-263033 A | 9/2004 |

(Continued)

OTHER PUBLICATIONS

Written Opinion of the International Searching Authority, corresponding to PCT/KR2017/010220, dated Dec. 27, 2017, 5 pages.

(Continued)

*Primary Examiner* — Irina S Zemel
(74) *Attorney, Agent, or Firm* — Lewis Roca Rothgerber Christie LLP

(57) ABSTRACT

The present disclosure relates to a resin composition for preparing polyolefin-based foamed articles having flame retardancy and flame retardant foamed articles formed therefrom. The resin composition according to the present disclosure can provide foamed articles having excellent flame retardancy and flame resistance while exhibiting a high fusion ratio and a low shrinkage ratio in the foam molding.

7 Claims, No Drawings

(56) References Cited

U.S. PATENT DOCUMENTS

2013/0158141 A1  6/2013 Ravestyn et al.

FOREIGN PATENT DOCUMENTS

| | | |
|---|---|---|
| JP | 2011-506723 A | 3/2011 |
| JP | 2013-523904 A | 6/2013 |
| JP | 2013-539495 A | 10/2013 |
| JP | 2016-37551 A | 3/2016 |
| KR | 10-0496175 B1 | 6/2005 |
| KR | 10-0772289 B1 | 11/2007 |
| KR | 10-0910160 B1 | 7/2009 |
| KR | 10-2012-0077060 A | 7/2012 |
| KR | 10-2013-0014412 A | 2/2013 |
| WO | WO 2016/052739 A1 | 4/2016 |

OTHER PUBLICATIONS

International Search Report, corresponding to PCT/KR2017/010220, dated Dec. 27, 2017, 5 pages including English translation.

* cited by examiner

RESIN COMPOSITION FOR PREPARING POLYOLEFIN BASED FLAME RETARDANT FOAMED ARTICLES AND FLAME RETARDANT FOAMED ARTICLES THEREFROM

CROSS-REFERENCE TO RELATED APPLICATION(S)

This application is a National Phase Patent Application and claims priority to and the benefit of International Application Number PCT/KR2017/010220, filed on Sep. 19, 2017, which claims priority to and the benefit of Korean Patent Application No. 10-2016-0119487, filed on Sep. 19, 2016 with the Korean Intellectual Property Office, the disclosure of each of which is incorporated herein by reference in its entirety.

TECHNICAL FIELD

The present disclosure relates to a resin composition for preparing polyolefin-based foamed articles having flame retardancy, and flame retardant foamed articles formed therefrom.

BACKGROUND OF ART

Resin foams are widely used in a variety of industrial fields such as automobile, construction, and electronics fields, because they can impart appropriate chemical, physical, and mechanical properties while having low density.

In general, in order to impart flame retardancy to the resin foam, a method of coating the resin foam with a flame retardant composition or compounding (or blending) the flame retardant into the resin composition to form a foam may be considered.

The coating method is relatively advantageous in that it can impart flame retardancy to the resin foam by using a small amount of flame retardant, but the flame retardant coating layer formed on a surface of the resin foam is liable to be peeled off, thereby making it difficult to manifest stable flame retardant performance. On the other hand, the compounding method is disadvantageous in that a relatively large amount of flame retardant is required, which increases the density of the resin foam, but it has an advantage of being able to exhibit stable and long-term flame retardancy.

When imparting flame retardancy by the compounding method, since the flame retardants are harmful to the environment and a human body and have a sensitive influence on combustion characteristics, compatibility of compositions, process efficiency, and the like, it is required to be used strictly. Particularly, in the case of the flame retardant foam, it is necessary to maintain a proper level of flame retardancy and foam moldability in the preparation process of the resin foam, while achieving both low density as a foam and a flammability rating according to relevant standards.

However, various characteristics such as flame retardancy, density, and moldability that can be imparted to the resin foam are in a trade-off relationship such that it is difficult for them to be compatible with each other, and therefore, the properties must be compromised at an appropriate level.

DETAILED DESCRIPTION OF THE INVENTION

Technical Problem

The present disclosure provides a resin composition capable of providing foamed articles having excellent flame retardancy and flame resistance while exhibiting a high fusion ratio and a low shrinkage ratio in the foam molding.

In addition, the present disclosure provides flame retardant foamed articles formed from the resin composition.

Technical Solution

According to the present disclosure, a resin composition for preparing polyolefin-based flame retardant foamed articles includes 94 to 97 wt % of a polyolefin resin and 3 to 6 wt % of a flame retardant, wherein the flame retardant contains a bromine-based flame retardant, a phosphorus-based flame retardant, and a nitrogen-based flame retardant in a weight ratio of 1:0.6 to 30:0.6 to 20.

According to the present disclosure, polyolefin-based flame retardant foamed articles including foam-molded articles of the resin composition are also provided.

Hereinafter, the resin composition for preparing polyolefin-based foamed articles and the polyolefin-based foamed articles according to the exemplary embodiments of the present disclosure will be described in more detail.

In this specification, the terms are used merely to refer to specific embodiments, and are not intended to restrict the present disclosure.

Singular expressions of the present disclosure may include plural expressions unless it is differently expressed contextually.

The terms 'include', 'comprise', 'contain', and the like of the present disclosure are used to specify certain features, regions, integers, steps, operations, elements, or components, and these do not exclude the existence or the addition of other certain features, regions, integers, steps, operations, elements, or components.

According to the results of research conducted by the present inventors, it has been found that when a flame retardant containing a bromine-based flame retardant, a phosphorus-based flame retardant, and a nitrogen-based flame retardant in a specific weight ratio is applied in the preparation of foamed articles using a polyolefin-based resin, foamed articles satisfying both excellent flame retardancy and flame resistance with low density can be provided.

I. Resin Composition for Preparing Polyolefin-Based Flame Retardant Foamed Articles One embodiment of the present disclosure provides a resin composition for preparing polyolefin-based flame retardant foamed articles, including 94 to 97 wt % of a polyolefin resin and 3 to 6 wt % of a flame retardant, wherein the flame retardant contains a bromine-based flame retardant, a phosphorus-based flame retardant, and a nitrogen-based flame retardant in a weight ratio of 1:0.6 to 30:0.6 to 20.

The resin composition according to the present disclosure has a low content of the flame retardant at 6 wt % or less, which is advantageous in exhibiting excellent foam moldability and low density required for the foamed articles.

Particularly, although the total content of the flame retardant contained in the resin composition is low, the combination of the bromine-based flame retardant, the phosphorus-based flame retardant, and the nitrogen-based flame retardant adjusted to the specific weight ratio makes it possible to provide flame retardant foamed articles satisfying an excellent flammability rating according to relevant standards, and flame resistance.

Hereinafter, each component that can be included in the resin composition will be described in more detail.

First, the polyolefin resin is preferably used as a base resin that forms a foamed article because of its low surface hardness, excellent flexibility, and excellent surface protection performance of the objects.

The polyolefin resin may be used without limitation as long as it is generally used in the art. According to one embodiment of the present disclosure, the polyolefin resin may be at least one resin selected from the group consisting of polyethylene, polypropylene, polybutene, polyisobutylene, polymethylpentene, an ethylene-propylene copolymer, an ethylene-butene copolymer, and a propylene-butene copolymer.

The polyolefin resin preferably has a weight average molecular weight (Mw) of 10,000 to 600,000 g/mol.

Specifically, the weight average molecular weight (Mw) of the polyolefin resin may be 10,000 g/mol or more, 50,000 g/mol or more, or 100,000 g/mol or more; and 600,000 g/mol or less, 500,000 g/mol or less, 400,000 g/mol or less, or 300,000 g/mol or less.

In order to manifest basic mechanical properties required for the foamed articles, the weight average molecular weight of the polyolefin resin is preferably 10,000 g/mol or more. However, when the molecular weight is excessively large, compatibility of the composition and foam moldability may be deteriorated. Therefore, the weight average molecular weight of the polyolefin resin is preferably 600,000 g/mol or less.

The polyolefin resin may be included in an amount of 60 wt % or more, 80 wt % or more, 90 wt % or more, 90 to 97 wt %, or 94 to 97 wt % based on a total weight of the resin composition.

The polyolefin resin is preferably included in an amount of 60 wt % or more, 80 wt % or more, 90 wt % or more, or 94 wt % or more based on a total weight of the resin composition, for manifesting basic mechanical properties required of the foamed articles. However, it is preferable that the polyolefin resin is included in an amount of 97 wt % or less based on a total weight of the resin composition for manifesting flame retardancy upon addition of the flame retardant.

Meanwhile, according to one embodiment of the present disclosure, the resin composition for preparing polyolefin-based flame retardant foamed articles includes a flame retardant consisting of a bromine-based flame retardant, a phosphorous-based flame retardant, and a nitrogen-based flame retardant.

In particular, it is preferable that the flame retardant contains a bromine-based flame retardant, a phosphorus-based flame retardant, and a nitrogen-based flame retardant in a weight ratio of 1:0.6 to 30:0.6 to 20. The weight ratio is in the order of the contents of the phosphorus-based flame retardant (0.6 to 30) and the nitrogen-based flame retardant (0.6 to 20) based on the content of the bromine-based flame retardant (1).

For example, the flame retardant may contain the bromine-based flame retardant, the phosphorus-based flame retardant, and the nitrogen-based flame retardant in a weight ratio of 1:0.6:0.6, 1:0.6:20, 1:0.67:0.67, 1:1:1, 1:2:1, 1:2.5:1.25, 1:2.5:2.5, 1:5:10, 1:30:0.6, or 1:30:20.

The flame retardant containing the bromine-based flame retardant, the phosphorus-based flame retardant, and the nitrogen-based flame retardant adjusted within the above-mentioned weight ratio range can impart excellent flame retardancy to the foamed articles of the resin composition even with a small amount.

Preferably, the flame retardant containing the bromine-based flame retardant, the phosphorus-based flame retardant, and the nitrogen-based flame retardant may be included in an amount of 6 wt % or less, or 3 to 6 wt %, based on a total weight of the resin composition. That is, the bromine-based flame retardant, the phosphorus-based flame retardant, and the nitrogen-based flame retardant adjusted within the above-mentioned weight ratio range can exhibit excellent flame retardancy even with the total amount of 6 wt % or less.

More preferably, the flame retardant may be included in an amount of 3 wt % or more, or 3.5 wt % or more; and 6 wt % or less, 5.5 wt % or less, or 5.1 wt % or less. According to one embodiment of the present disclosure, the flame retardant may include 0.06 to 1.75 wt %, 0.1 to 1.75 wt %, or 0.1 to 1.5 wt % of the bromine-based flame retardant, 0.5 to 3.25 wt %, 1 to 3.25 wt %, or 1 to 3 wt % of the phosphorous-based flame retardant, and 0.5 to 2.25 wt %, 1 to 2.25 wt %, or 1 to 2 wt % of the nitrogen-based flame retardant based on a total weight of the resin composition.

Meanwhile, the bromine-based flame retardant is a kind of halogenated flame retardant and can exhibit excellent flame retardancy as compared with its content. However, the halogenated flame retardant may generate harmful gases such as dioxin derivatives and hydracids upon combustion, and may have adverse effects on the environment and a human body due to its residual property and bioaccumulation property. In this regard, the European Union REACH or RoHS Compliance strictly restricts the use of halogenated flame retardants. Therefore, it is preferable for the bromine-based flame retardant to be used within the content range according to the relevant regulations or guidelines.

Examples of the bromine-based flame retardant include 1,3,5-triazine-2,4,6-triamine hydrobromide (CAS #29305-12-2), polybrominated diphenyl ethers (PBDEs), polybrominated biphenyls (PBBs), tetrabromo bisphenol A (TBBP-A), hexabromocyclododecane (HBDC), and the like. However, the above-mentioned bromine-based flame retardants may be restricted or prohibited in accordance with the relevant regulations or guidelines. In terms of versatility, the bromine-based flame retardant is preferably 1,3,5-triazine-2,4,6-triamine hydrobromide.

Inorganic flame retardants exhibit a harmless flame retarding mechanism in most cases, but are not suitable for application of the inorganic flame retardant in excess to the foamed article which is required to be light, because they have relatively high density and poor flame retardancy with respect to the content. In particular, when the inorganic flame retardant is used in excess, the viscosity of the resin composition may increase and the process efficiency may be lowered, which may adversely affect structure retention of the foamed articles due to the development of micronized cells. The phosphorus-based flame retardant can exhibit flame retardancy with a smaller content than the inorganic flame retardant, and generates less smoke than other flame retardants. However, it can be difficult to form mini pellets for producing flame retardant foam particles by using the phosphorus-based flame retardant alone.

The mini pellet is a kind of resin particle for producing foam particles, and generally has a smaller particle size and a smaller per unit weight than a pellet formed by extrusion (preferably 1.2 to 1.5 mg/unit). In order to obtain mini pellets capable of exhibiting uniform performance in the preparation of the foam particles, a high-shear extrusion facility for mini pellets capable of increasing the degree of dispersion of the mixture should be used. However, when the phosphorus-based flame retardant is used alone, it may be difficult to produce mini pellets, since degradation may occur due to extrusion conditions under which high shear is applied.

The nitrogen-based flame retardant exhibits relatively good mixing performance with the components of the resin composition, but exhibits poor flame retardancy as compared with its content.

As described above, when the phosphorus-based flame retardant or the nitrogen-based flame retardant is used alone, it is difficult to improve various properties such as flame retardancy, density, moldability, and the like that can be imparted to the resin foam in a balanced manner. Therefore, it is preferable to apply the flame retardant in which the bromine-based flame retardant, the phosphorus-based flame retardant, and the nitrogen-based flame retardant are blended in a specific weight ratio in the preparation of the flame retardant foamed articles using the polyolefin-based resin, as in the embodiment of the present disclosure.

The phosphorus-based flame retardant and the nitrogen-based flame retardant may be used without limitation as long as they are generally used in the art. For example, the phosphorus-based flame retardant may preferably be ammonium polyphosphate (CAS #68333-79-9), phosphoric acid (CAS #7664-38-2), pentaerythritol phosphate (CAS #5301-78-0), or the like. The nitrogen-based flame retardant may preferably be melamine cyanurate (CAS #37640-57-6) or the like.

Meanwhile, the resin composition for preparing polyolefin-based flame retardant foamed articles may include components necessary for foaming.

Specifically, the components required for foaming include a physical foaming agent and a foam control agent. In addition, additives such as a nucleating agent, a dye, a dye dispersant, a heat stabilizer, an ultraviolet absorber, an antioxidant, a cell stabilizer, and a cell control agent may be included.

Examples of the physical foaming agent include propane, n-butane, iso-butane, n-pentane, iso-pentane, cyclopentane, n-hexane, iso-hexane, cyclohexane, carbon dioxide, oxygen, nitrogen, and the like. The content of the foaming agent can be adjusted according to the required degree of foaming. However, since the resin composition according to the embodiment of the present disclosure has excellent moldability, it is possible to achieve equivalent magnification even at a low pressure and a low foaming agent content.

II. Polyolefin-based flame retardant foamed articles

According to another embodiment of the present disclosure, polyolefin-based flame retardant foamed articles including foam-molded articles of the above resin composition are provided.

The polyolefin-based flame retardant foamed articles include 94 to 97 wt % of a polyolefin resin and 3 to 6 wt % of a flame retardant, and may particularly be obtained from foam-molded articles of the resin composition including a flame retardant containing a bromine-based flame retardant, a phosphorus-based flame retardant, and a nitrogen-based flame retardant in a weight ratio of 1:0.6 to 30:0.6 to 20.

According to one embodiment, the polyolefin-based flame retardant foamed articles may be obtained by fusion-molding the foam-molded articles (for example, beads) of the above resin composition.

Accordingly, the polyolefin-based flame retardant foamed articles may exhibit a high fusion ratio and a low shrinkage ratio, and may have low density, and excellent flame retardancy and flame resistance.

Specifically, the polyolefin-based flame retardant foamed articles may exhibit excellent flame retardancy of an HF-1 rating according to a UL 94 HBF Test (Horizontal Burning Foamed Material Test).

Further, the polyolefin-based flame retardant foamed articles may exhibit excellent flame resistance satisfying a carbonized distance of 15 cm or less, preferably 10 cm to 15 cm, more preferably 12 cm to 15 cm, according to Article 7 (Standards and Methods for Flame Resistant Performance Measurement of synthetic resin plates, plywood, and the like) of 'Flame Resistant Performance Standards' of the Korean Ministry of Public Safety and Security Notification No. 2015-1.

In general, polyolefin-based construction materials are required to have flame retardancy (UL 94 rating) such that they do not burn well, whereas in the case of polyolefin-based packaging materials, flame resistance (carbonized distance) that prevents a fire from spreading to other places, as well as the flame retardancy of the UL 94 rating, is indispensably required. From this point of view, the polyolefin-based flame retardant foamed articles satisfying both excellent flame retardancy and flame resistance can be applied to various fields such as construction materials and packaging materials.

The polyolefin-based flame retardant foamed articles may exhibit a high fusion ratio of 50% or more, 60% or more, 70% or more, 80% or more, or 50 to 80%. According to one embodiment, the polyolefin-based flame retardant foamed articles are obtained by fusion-molding the foam-molded articles (for example, beads), and when an arbitrary cut surface of the foamed articles is observed, an area where the foam-molded articles are fused together represents 50 to 80% of the arbitrary cut surface area.

In addition, the polyolefin-based flame retardant foamed articles may exhibit a low shrinkage ratio of 2.5% or less, 2.4% or less, 2.3% or less, 2.2% or less, or 2.1% or less. According to one embodiment, the polyolefin-based flame retardant foamed articles are obtained by fusion-molding the foam-molded articles, and may have a shrinkage ratio of 2.5% or less, which is determined by comparing dimensions of the foamed articles obtained by drying the foam-molded articles at 50° C. for 6 hours immediately after molding with dimensions of a mold used for the molding.

The polyolefin-based flame retardant foamed articles can be obtained by a foam molding method that is common in the art. For example, the polyolefin-based flame retardant foamed articles can be prepared by an extrusion foaming method using an extruder equipped with a T die, a circular die, and the like.

Herein, a foaming temperature may be controlled to be higher than the crystallization temperature of the polyolefin resin, and preferably, the temperature may be controlled to be 5 to 30° C. higher than the crystallization temperature of the polyolefin resin.

Advantageous Effects

The resin composition according to the present disclosure can provide foamed articles having excellent flame retardancy and flame resistance while exhibiting a high fusion ratio and a low shrinkage ratio in the foam molding.

Detailed Description of the Embodiments

Hereinafter, the present invention will be described in more detail with reference to examples. However, these examples are for illustrative purposes only, and the invention is not intended to be limited by these examples.

Examples and Comparative Examples

The components shown in Tables 1 to 3 below were mixed to prepare a resin composition for preparing polyolefin-based flame retardant foamed articles.

The components used in the preparation of the resin composition are as follows.
- PP: polypropylene resin (weight average molecular weight: 248,600 g/mol)
- Br-FR: bromine-based flame retardant (1,3,5-triazine-2,4,6-triamine hydrobromide)
- P-FR: phosphorous-based flame retardant (ammonium polyphosphate)
- N-FR: nitrogen-based flame retardant (melamine cyanurate)

The prepared resin composition was extruded and foamed under the temperature and pressure conditions shown in Tables 4 to 6 to obtain polyolefin-based beads.

Thereafter, the beads were molded under the molding pressure shown in Tables 7 to 9 below to obtain specimens of polyolefin-based foamed articles.

Experimental Example

The properties of the beads and the specimens of the foamed articles according to examples and comparative examples were measured in the following manner, and the results are shown in Tables 4 to 9 below.

(i) The Properties of Beads

1) Appearance

The surface of the bead was observed with the naked eye to evaluate presence or absence of pores on the surface and whether the surface was dented or shrunk or not. When a ratio of the beads in a good state was 90% or more, this was expressed as 'O', when 70% or more and 90% or less, expressed as 'Δ', and when less than 70%, expressed as 'X'.

2) Density (g/L)

About 200 ml of the foamed particles were sampled and their mass (W) was measured, and were then poured into a measuring cylinder containing water (volume V1) at a temperature of 23° C. Thereafter, a total volume (V3) was measured after the foamed particles were sunk using a push rod having a known volume (V2). Subsequently, the density was determined by dividing the mass W (g) of the sampled foamed particles by the volume of the foamed particles (V3−V1−V2)(L).

3) Cell Size (μm)

Three arbitrarily selected foamed particles were cut into two equal parts and the cut surfaces were observed at 20 KV and 30 times magnification using a scanning electron microscope (SEM). Thereafter, average cell size was measured by an image analysis program (Leica Application Suite).

4) Uniformity

The beads were observed with the naked eye, and the uniformity of the size was evaluated as uniform (○) or uneven (X).

(ii) The Properties of the Foamed Articles

1) The Shrinkage Ratio (%)

Immediately after the molding, the foamed articles were dried at 50° C. for 6 hours. The dimensions (width, length, and height) of the dried foamed articles were measured using a post-ruler. Then, the shrinkage ratio (%) was calculated by comparing the measured value with the dimensions (width, length, and height) of a mold used for the molding.

2) The Fusion Ratio (%)

After cutting one side of the foamed articles, the cut surfaces were photographed with a microscope. The area ratio (%) of the part where the beads were fused to each other on the cut surface was calculated based on a total area of the cut surface. Herein, in the part where the beads were fused well, the bead surfaces were not observed and the beads were observed in a split or broken form. In the part where the fusion was not good, the bead surface was exposed and could be observed with the naked eye.

3) Flame Resistance—Carbonized Distance (Cm)

Measured according to Article 7 (Standards and Methods for Flame Resistant Performance Measurement of Synthetic Resin Plates, Plywood and the like) of 'Flame Resistant Performance Standards' of the Korean Ministry of Public Safety and Security Notification No. 2015-1. Specifically, a specimen having a width of 29 cm and a length of 19 cm was fixed to a holder of a combustion test apparatus, and then a 65 mm-long flame was generated so that the tip was in contact with the bottom center of the specimen, followed by heating for 2 minutes. Under these conditions, a maximum length of the carbonized section was measured.

Article 7 (Standards and Methods for Flame Resistant Performance Measurement of Synthetic Resin Plates, Plywood and the Like)

The standards and methods for measuring the flame resistance performance of synthetic resin plates, plywood, interior film-attached plywood, and the like should comply with the following requirements.

1. The combustion test apparatus uses a combustion test box [Annex 1], a specimen holder [Annex 5], an electric spark generator [Annex 3], and a Mekel burner [Annex 7].
2. The fuel used for the test should be suitable for KS M 2150 (liquefied petroleum gas).
3. The specimen is 29 cm in width and 19 cm in length, which is randomly cut from the object to be measured of 1.6 m$^2$ or more. Three specimens are made.
4. The specimen is dried in a constant temperature drier at 40±2° C. for 24 hours, and put in a desiccator containing silica gel for 2 hours. However, when the specimen is not affected by heat, it is possible to put it in a desiccator containing silica gel for 2 hours after drying for 1 hour in a constant temperature drier at 105±2° C.
5. The performance measurement complies with the following method.
   A. The specimen should be fixed to the specimen holder.
   B. The flame length of the burner should be 65 mm.
   C. The burner should be installed so that the tip of the flame contacts the bottom center of the specimen.
   D. Heating should be carried out for 2 minutes for each specimen.

4) Flammability Rating

After flame time, after flame time plus afterglow time for each individual specimen, cotton ignition, and damaged length for each individual specimen were measured according to a UL 94 HBF Test (Horizontal Burning Foamed Material Test). Three ratings (HF-1>HF-2>HBF) were assigned according to the criteria.

TABLE 1

| (wt %) | Example 1 | Example 2 | Example 3 | Example 4 |
|---|---|---|---|---|
| PP | 96.2 | 94.9 | 96.0 | 96.5 |
| Br-FR | 0.8 | 0.1 | 1.0 | 1.5 |
| P-FR | 2.0 | 3.0 | 2.0 | 1.0 |
| N-FR | 1.0 | 2.0 | 1.0 | 1.0 |

TABLE 2

| (wt %) | Comp. Example 1 | Comp. Example 2 | Comp. Example 3 | Comp. Example 4 | Comp. Example 5 |
|---|---|---|---|---|---|
| PP | 80.0 | 75.0 | 75.0 | 80.0 | 95.5 |
| Br-FR | — | — | — | — | 1.5 |
| P-FR | 20.0 | 20.0 | 25.0 | — | 3.0 |
| N-FR | — | 5.0 | — | 20.0 | — |

TABLE 3

| (wt %) | Comp. Example 6 | Comp. Example 7 | Comp. Example 8 | Comp. Example 9 |
|---|---|---|---|---|
| PP | 93.5 | 93.5 | 96.5 | 95.0 |
| Br-FR | 1.0 | 1.0 | 1.5 | — |
| P-FR | 3.5 | 3.0 | — | 3.0 |
| N-FR | 2.0 | 2.5 | 2.0 | 2.0 |

TABLE 4

| Bead | Example 1 | Example 2 | Example 3 | Example 4 |
|---|---|---|---|---|
| Foaming temperature (° C.)/pressure (bar) | 151/30 | 151/30 | 151/30 | 151/30 |
| Density (g/L) | 59 | 60 | 63 | 61 |
| Cell size (μm) | 170 | 150 | 150 | 150 |
| Uniformity | ○ | ○ | ○ | ○ |
| Appearance | ○ | ○ | ○ | ○ |

TABLE 5

| Bead | Comp. Example 1 | Comp. Example 2 | Comp. Example 3 | Comp. Example 4 | Comp. Example 5 |
|---|---|---|---|---|---|
| Foaming temperature (° C.)/pressure (bar) | 151/35 | 151/35 | 151/35 | 151/35 | 151/30 |
| Density (g/L) | 69 | 71 | 72 | 68 | 61 |
| Cell size (μm) | 70 | 70 | 45 | 65 | 150 |
| Uniformity | X | X | X | X | ○ |
| Appearance | Δ | Δ | Δ | Δ | ○ |

TABLE 6

| Bead | Comp. Example 6 | Comp. Example 7 | Comp. Example 8 | Comp. Example 9 |
|---|---|---|---|---|
| Foaming temperature (° C.)/pressure (bar) | 151/30 | 151/30 | 151/30 | 151/30 |
| Density (g/L) | 58 | 58 | 58 | 58 |
| Cell size (μm) | 75 | 60 | 150 | 150 |
| Uniformity | X | X | ○ | ○ |
| Appearance | Δ | Δ | ○ | ○ |

TABLE 7

| Foamed articles | Example 1 | Example 2 | Example 3 | Example 4 |
|---|---|---|---|---|
| Molding pressure (bar) | 3.0 | 3.0 | 3.0 | 3.0 |
| Shrinkage ratio (%) | 2.0 | 2.1 | 2.1 | 2.1 |
| Fusion ratio (%) | 80 | 80 | 80 | 80 |
| Carbonized distance (cm) | 13 | 15 | 12 | 13 |
| Flammability rating | HF-1 | HF-1 | HF-1 | HF-1 |

TABLE 8

| Foamed articles | Comp. Example 1 | Comp. Example 2 | Comp. Example 3 | Comp. Example 4 | Comp. Example 5 |
|---|---|---|---|---|---|
| Molding pressure (bar) | 3.5 | 3.5 | 3.5 | 3.5 | 3.0 |
| Shrinkage ratio (%) | 2.7 | 2.9 | 3.0 | 2.8 | 2.0 |
| Fusion ratio (%) | 40 | 30 | 30 | 30 | 80 |
| Carbonized distance (cm) | 22 | 15 | 9 | — | — |
| Flammability rating | HF-1 | HF-1 | HF-1 | HBF | fail |

TABLE 9

| Foamed articles | Comp. Example 6 | Comp. Example 7 | Comp. Example 8 | Comp. Example 9 |
|---|---|---|---|---|
| Molding pressure (bar) | 3.5 | 3.5 | 3.0 | 3.0 |
| Shrinkage ratio (%) | 3.0 | 3.0 | 2.1 | 2.2 |
| Fusion ratio (%) | 40 | 30 | 80 | 80 |
| Carbonized distance (cm) | 15 | 15 | — | — |
| Flammability rating | HF-1 | HF-1 | fail | fail |

Referring to Tables 4 to 6, it was confirmed that the polyolefin-based flame retardant beads according to the examples had relatively low density compared with the comparative examples, a cell size of 150 μm or more, and excellent appearance and uniformity.

In addition, Referring to Tables 7 to 9, the polyolefin-based flame retardant foamed articles according to the examples of the present disclosure exhibited a higher fusion ratio and a lower shrinkage ratio than those of the comparative examples, as they are formed using the beads. Particularly, they showed short carbonized distances and high flammability ratings, and were confirmed to have excellent flame retardancy and flame resistance.

The invention claimed is:

1. A resin composition for preparing polyolefin-based flame retardant foamed articles, comprising 94 to 97 wt % of a polyolefin resin and 3 to 6 wt % of a flame retardant, wherein the flame retardant contains a bromine-based flame retardant, a phosphorous-based flame retardant, and a nitrogen-based flame retardant in a weight ratio of 1:0.6 to 30:0.6 to 20,
wherein the bromine-based flame retardant is 1,3,5-triazine-2,4,6-triamine hydrobromide, polybrominated diphenyl ethers, polybrominated biphenyls, tetrabromo bisphenol A, or hexabromocyclododecane; the phosphorous-based flame retardant is ammonium polyphosphate, phosphoric acid, or pentaerythritol phosphate; and the nitrogen-based flame retardant is melamine cyanurate.

2. The resin composition for preparing polyolefin-based flame retardant foamed articles of claim 1,
wherein the flame retardant consists of 0.06 to 1.75 wt % of the bromine-based flame retardant, 0.5 to 3.25 wt % of the phosphorous-based flame retardant, and 0.5 to 2.25 wt % of the nitrogen-based flame retardant based on a total weight of the resin composition.

3. The resin composition for preparing polyolefin-based flame retardant foamed articles of claim 1,
wherein the polyolefin resin is at least one resin selected from the group consisting of polyethylene, polypropylene, polybutene, polyisobutylene, polymethylpentene, an ethylene-propylene copolymer, an ethylene-butene copolymer, and a propylene-butene copolymer.

4. Polyolefin-based flame retardant foamed articles comprising foam-molded articles of the resin composition according to claim 1.

5. The polyolefin-based flame retardant foamed articles of claim 4,
having an HF-1 rating according to a UL 94 HBF Test, and
satisfying a carbonized distance of 15 cm or less according to Article 7 (Standards and Methods for Flame Resistant Performance Measurement of synthetic resin plates, plywood and the like) of 'Flame Resistant Performance Standards' of the Korean Ministry of Public Safety and Security Notification No. 2015-1.

6. The polyolefin-based flame retardant foamed articles of claim 4,
wherein the polyolefin-based flame retardant foamed articles are obtained by fusion-molding the foam-molded articles, and
when an arbitrary cut surface of the foamed articles is observed, an area where the foam-molded articles are fused together represents 50 to 80% of the arbitrary cut surface area.

7. The polyolefin-based flame retardant foamed articles of claim 4,
wherein the polyolefin-based flame retardant foamed articles are obtained by fusion-molding the foam-molded articles, and
they have a shrinkage ratio of 2.5% or less, which is determined by comparing dimensions of the foamed articles obtained by drying the foam-molded articles at 50° C. for 6 hours immediately after molding with dimensions of a mold used for the molding.

\* \* \* \* \*